(12) United States Patent
Sepänniitty et al.

(10) Patent No.: US 12,424,860 B2
(45) Date of Patent: Sep. 23, 2025

(54) CHARGER CABLE FOR A WEARABLE DEVICE

(71) Applicant: Suunto Oy, Vantaa (FI)

(72) Inventors: Mikko Sepänniitty, Vantaa (FI); Niko Tarnanen, Vantaa (FI); Eero Varjonen, Vantaa (FI); Ari Hurtta, Vantaa (FI)

(73) Assignee: Suunto Oy, Vantaa (FI)

( * ) Notice: Subject to any disclaimer, the term of this patent is extended or adjusted under 35 U.S.C. 154(b) by 745 days.

(21) Appl. No.: 17/741,090

(22) Filed: May 10, 2022

(65) Prior Publication Data

US 2022/0360098 A1 Nov. 10, 2022

(30) Foreign Application Priority Data

May 10, 2021 (FI) .................................. 20215557

(51) Int. Cl.
*H01M 10/46* (2006.01)
*H02J 7/00* (2006.01)

(52) U.S. Cl.
CPC .......... *H02J 7/0044* (2013.01); *H02J 7/0034* (2013.01)

(58) Field of Classification Search
CPC ...... H02J 7/0044; H02J 7/0042; H02J 7/0034; H01R 13/02; H01R 13/22; H01R 13/6205
USPC .................................. 320/107, 111, 114, 115
See application file for complete search history.

(56) References Cited

U.S. PATENT DOCUMENTS

| | | |
|---|---|---|
| 2011/0089891 A1 | 4/2011 | Pai |
| 2018/0103135 A1 | 4/2018 | Thiers |
| 2020/0028300 A1 | 1/2020 | Huang et al. |
| 2021/0029475 A1 | 1/2021 | Bin Shith et al. |
| 2021/0036557 A1 * | 2/2021 | Haug .................... H02J 50/005 |

FOREIGN PATENT DOCUMENTS

| | | | |
|---|---|---|---|
| CN | 206774812 U | 12/2017 | |
| KR | 101655922 B1 | 9/2016 | |
| WO | WO-2016170524 A1 * | 10/2016 | ............. A47F 3/002 |
| WO | WO2018202730 A1 | 11/2018 | |
| WO | WO2019007144 A1 | 1/2019 | |
| WO | WO2020027892 A1 | 2/2020 | |
| WO | WO2020062626 A1 | 4/2020 | |
| WO | WO2021083037 A1 | 5/2021 | |

* cited by examiner

*Primary Examiner* — Edward Tso
(74) *Attorney, Agent, or Firm* — Laine IP Oy

(57) ABSTRACT

There is provided a charger for charging a wearable device, comprising a charger head comprising a first connector with positive polarity; and a second connector with negative polarity, wherein the first connector and the second connector are arc-shaped.

18 Claims, 7 Drawing Sheets

CHARGER CABLE FOR A WEARABLE DEVICE

FIELD

Various example embodiments relate to charging of a wearable.

BACKGROUND

Wearable devices such as smart watches or activity bracelets have batteries that need to be charged every now and then. A wearable device comprises connectors through which an electrical connection may be formed between the device and a charger cable. It may be cumbersome to connect the wearable device and the charger.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided a charger for charging a wearable device, comprising a charger head comprising a first connector with positive polarity; and a second connector with negative polarity, wherein the first connector and the second connector are arc-shaped.

According to a further aspect, there is provided a wearable device, comprising connectors comprising a first connector and a second connector for interfacing with another device and/or a charger; a first switch for connecting the first connector and the second connector to a battery charging circuit of the wearable device; a second switch for connecting the first connector and the second connector to a communication circuit of the wearable device; a control unit configured to: enable an electrical connection between the connectors and the battery charging circuit, when the first switch is closed and the second switch is open; and enable communication with another device for data transfer via the connectors, when the first switch is open and the second switch is closed.

According to an embodiment, the first connector and the second connector are configured to have reversible polarities.

According to an embodiment, the wearable device comprises an alternating current bridge between the switch and the battery charging circuit.

According to an embodiment, a material of the first connector and the second connector is magnetic or the wearable device comprises magnetic material in proximity of the first connector and the second connector.

According to an embodiment, the wearable device is a smart watch or an activity bracelet.

According to an embodiment, the first connector and the second connector are placed symmetrically on a caseback of the wearable device.

According to an embodiment, a surface of the caseback has, at least partly, a form of a curved dome for receiving a charger head comprising a surface having, at least partly, a concave form.

According to an embodiment, the first connector is configured to i) function as a positive connector if arranged in contact with a positive connector of the charger; and wherein the second connector is configured to, function as a negative connector if arranged in contact with a negative connector of the charger; or ii) function as a negative connector if arranged in contact with a negative connector of the charger; and wherein the second connector is configured to function as a positive connector if arranged in contact with a positive connector of the charger.

According to an embodiment, the wearable devices comprises a control unit configured to close and/or open the first switch and the second switch based on an input signal received via the connectors.

According to an embodiment, the first switch is configured to be closed and the second switch is configured to be open by default when the wearable device is not connected to another device or a charger.

According to a further aspect, there is provided a docking station, comprising connectors comprising a first connector and a second connector for interfacing with a wearable device; a first switch for connecting the connectors to a power supply; a second switch for connecting the connectors to a communication circuit of the docking station; a control unit configured to enable an electrical connection between the power supply and the connectors, when the first switch is closed and the second switch is open; and enable communication with the wearable device for data transfer via the connectors, when the first switch is open and the second switch is closed.

According to an embodiment, the docking station comprises a user interface for receiving input of a selection of a charging state or a communication state, wherein the first switch is closed and the second switch is open in the charging state; and the first switch is open and the second switch is closed in the communication state.

According to an embodiment, the docking station comprises a port for enabling connecting the docking station to a host device.

DETAILED DESCRIPTION

Figure 1:
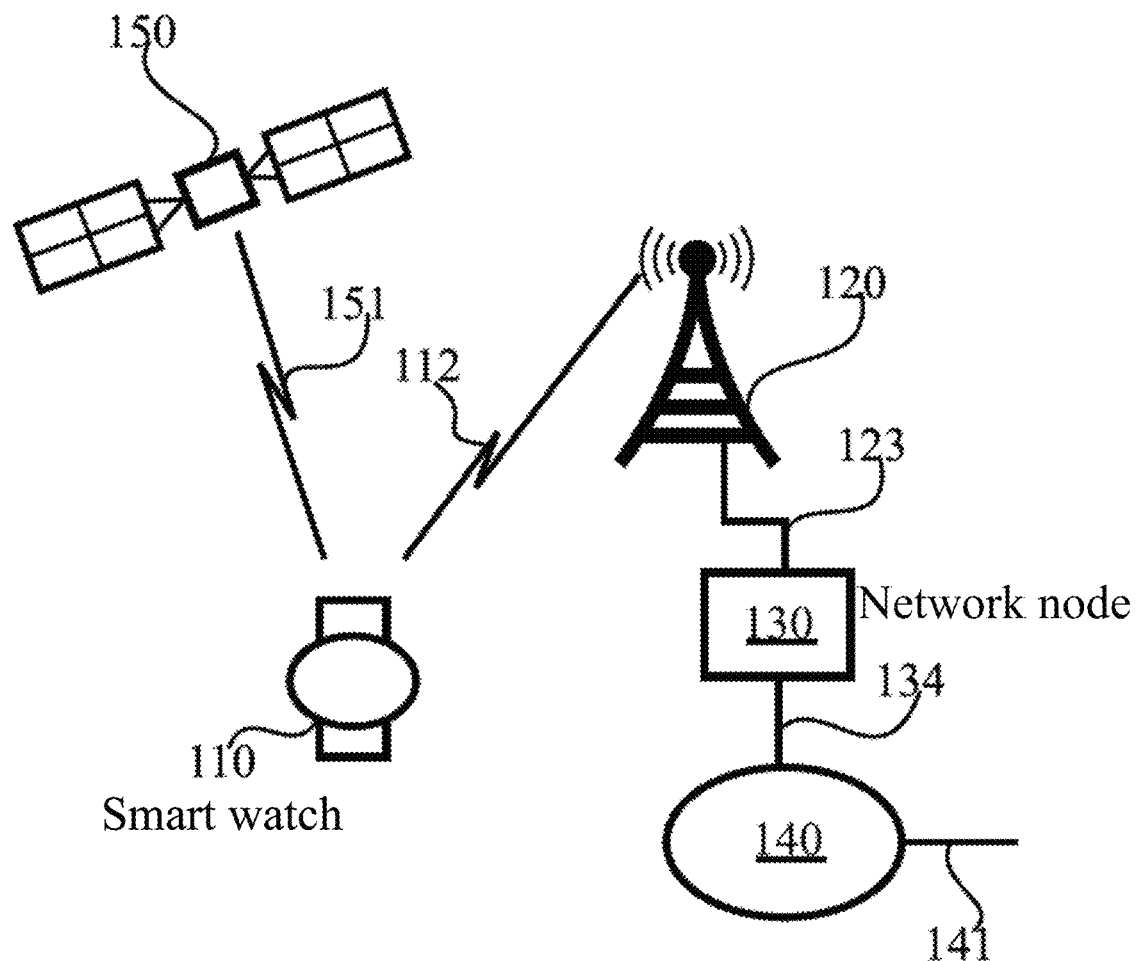
FIG. 1 shows, by way of example, a system.

FIG. 1 shows, by way of example, a system 100. The system comprises device 110, which may comprise, for example, a wearable device such as a smart watch, digital watch, or an activity bracelet. Device 110 may comprise a display, which may comprise a touchscreen display, for example. Device 110 may be powered, for example, by a rechargeable battery.

Device 110 may be communicatively coupled with a communications network. For example, in FIG. 1 device 110 is coupled, via wireless link 112, with base station 120. Base station 120 may comprise a cellular or non-cellular base station, wherein a non-cellular base station may be referred to as an access point. Examples of cellular technologies include wideband code division multiple access, WCDMA, and long term evolution, LTE, while examples of non-cellular technologies include wireless local area network, WLAN, and worldwide interoperability for microwave access, WiMAX. Base station 120 may be coupled with network node 130 via connection 123. Connection 123 may be a wire-line connection, for example. Network node 130 may comprise, for example, a controller or gateway device. Network node 130 may interface, via connection 134, with network 140, which may comprise, for example, the Internet or a corporate network. Network 140 may be coupled with further networks via connection 141. In some embodiments, device 110 is not configured to couple with base station 120. Network 140 may comprise, or be communicatively coupled, with a back-end server, for example.

Device 110 may be configured to receive, from satellite constellation 150, satellite positioning information via satellite link 151. The satellite constellation may comprise, for example the global positioning system, GPS, or the Galileo constellation. Satellite constellation 150 may comprise more than one satellite, although only one satellite is illustrated in FIG. 1 for the same of clarity. Likewise, receiving the positioning information over satellite link 151 may comprise receiving data from more than one satellite.

Alternatively or additionally to receiving data from a satellite constellation, device 110 may obtain positioning information by interacting with a network in which base station 120 is comprised. For example, cellular networks may employ various ways to position a device, such as trilateration, multilateration or positioning based on an identity of a base station with which attachment is possible or ongoing. Likewise a non-cellular base station, or access point, may know its own location and provide it to device 110, enabling device 110 to position itself within communication range of this access point.

Device 110 may be configured to obtain a current time from satellite constellation 150, base station 120 or by requesting it from a user, for example. Once device 110 has the current time and an estimate of its location, device 110 may consult a look-up table, for example, to determine a time remaining until sunset or sunrise, for example. Device 110 may likewise gain knowledge of the time of year.

Figure 2A:
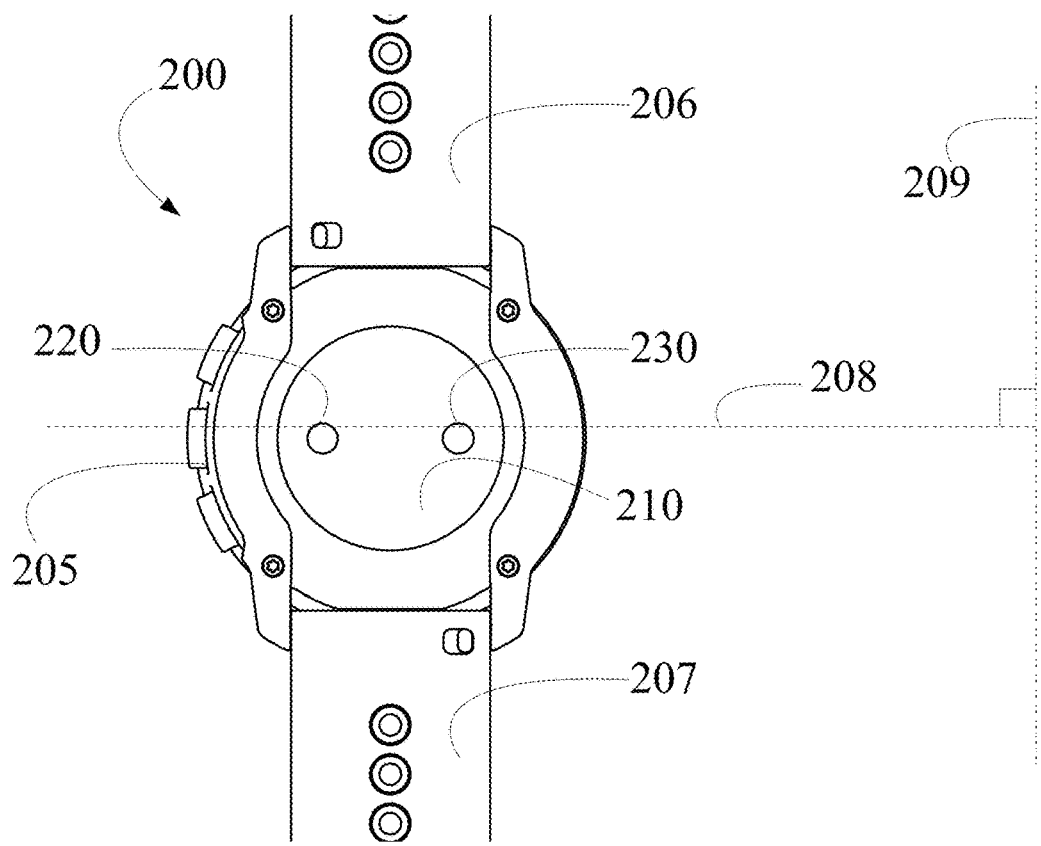
FIGS. 2a and 2b show, by way of example, a bottom view of a wearable device and a top view of a charger cable.
Figure 2B:
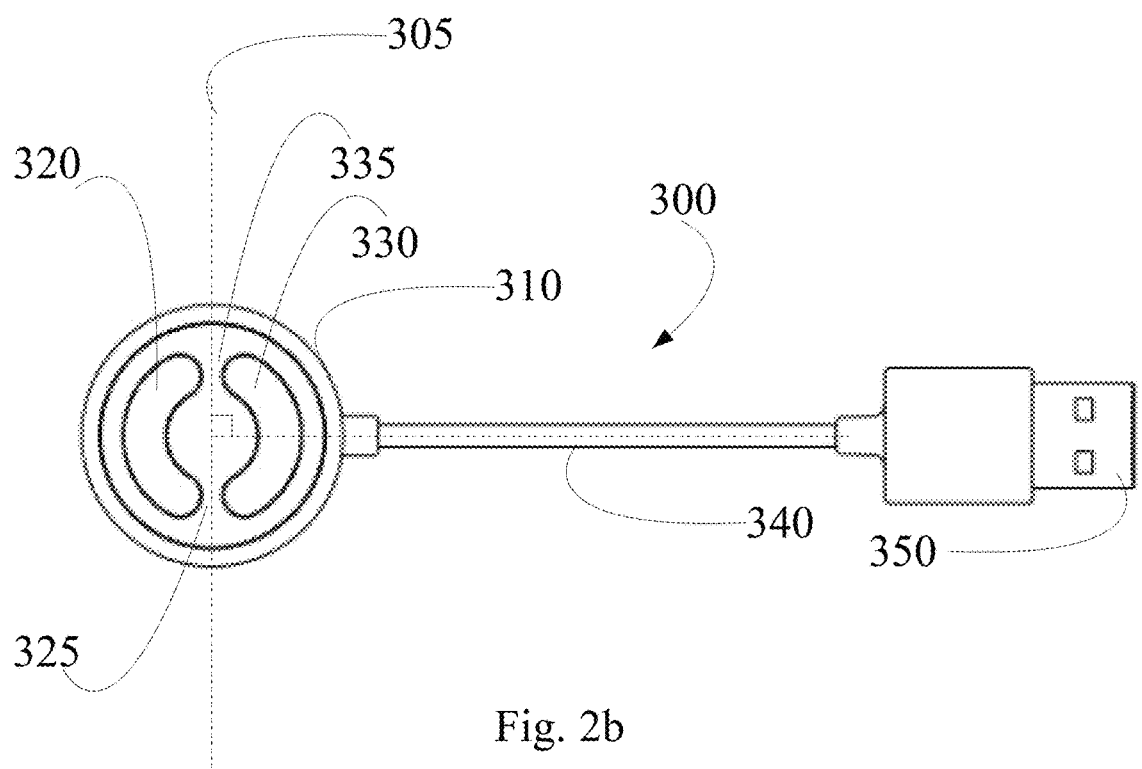

FIGS. 2a and 2b show, by way of example, a bottom view of a wearable device 200 and a top view of a charger or charger cable 300. The wearable device, e.g. smart watch, comprises a housing 205 or a body and wrist straps 206, 207. Front side of the housing comprises a display. A reverse side or a backside of the housing that is laying on the wrist of a user may be referred to as a caseback 210. The wearable device comprises a rechargeable battery. The wearable device may comprise means for optical heart rate (OHR) measurement, and thus the wearable device may comprise light emitting diodes (LEDs) on the caseback. Wrist heart rate technology, or optical heart rate, is based on measuring blood flow in a wrist via LEDs installed on the caseback of the wearable device.

The battery of the wearable device needs to be charged occasionally. Charging may be performed using a charger cable 300. The charger cable 300 may comprise a charger head 310, a cable 340, and a connector 350 which may be connected to a power source. The cable 340 is coupled or attached to the charger head 310. For example, the connector may be a universal serial bus (USB) connector for connecting the charger to a device comprising a USB port. The device may be e.g. a computer or a laptop which may be used for charging the wearable device. Alternatively, the connector 350 may be connected to a USB port of a transformer, which may be plugged into the mains to receive power for charging. According to an example, the cable 340 may be connected to a transformer in a fixed manner.

The caseback 210 comprises connectors 220, 230 or contacts for establishing electrical connection between a battery charging circuit of the wearable device and connectors 320, 330 or contacts of the charger 300.

Connectors may be pins or studs or pads, for example. As shown in FIG. 2a, the smart watch 200 comprises two connectors or pins, a first connector 220 and a second connector 230. The pins may be symmetrically placed on the caseback 210. This enables and maximizes the rotational freedom such that the charger may be rotated almost around a full circle without losing electrical contact between the connectors 220, 230 of the caseback and the arc-shaped connectors of the charger head, as described in the context of FIG. 3b. Pins 220, 230 that reserve smaller area from the surface of the caseback, than e.g. larger pads, are beneficial. Then, more space may be left for the OHR sensors, for example. In addition, in manufacturing of smart watches, number of inlets and/or area covered by inlets is/are beneficial to be as small as possible. Placement of the pins to the caseback is sealed such that it is watertight. For example, an o-ring may be used for the sealing.

Pins 220, 230 may be metal contacts, e.g. ferrous metal contacts. If the material of the pins is magnetic they are attracted to a magnet. Example of a material of the pins is stainless steel, e.g. AISI 630. The pins may apply magnetic force in order to align with the pins of the charger. Magnetic alignment may be realized such that the charger head 310 comprises magnets, which attract the pins of the caseback when a distance between the caseback 210 and the charger head 310 is small enough. If the material of the pins is not magnetic, e.g. austenitic stainless steel (AISI 316) or bronze, a magnetic metal part may be placed inside the casing, e.g. in proximity of the pins. For example, magnetic rings may be placed around the pins inside the caseback.

Magnets comprised in the charger head 310 may reside under the connectors 320, 330. The magnetic force of the magnets is strong enough to attract the caseback 210 comprising the pins 220, 230 when a distance between the caseback 210 and the charger head 310 is small enough.

The charger head 310 comprises two connectors, e.g. a first connector 320 and a second connector 330. The connectors of the charger may take a form of an arc. A first connector 320 may comprise positive polarity and the second connector 330 may comprise negative polarity. For example, the charger head may comprise exactly two connectors.

The arc-shaped connectors 320, 330 may be placed symmetrically on the charger head 310. The arc-shaped connectors have a first end and a second end. The first end of the first connector 320 and the first end of the second connector 330 are pointing towards each other such that a small non-conductive gap 335 is between the first ends. Similarly, the second end of the first connector 320 and the second end of the second connector 330 are pointing towards each other such that a small non-conductive gap 325 is between the second ends. In at least some embodiments, the first connector does not form a full circle, and the second connector does not form a full circle. The first connector and the second connector are concentric arcs. In at least some embodiments, the first connector and the second connector are concentric arcs separated by non-conductive gaps.

Figure 3A:
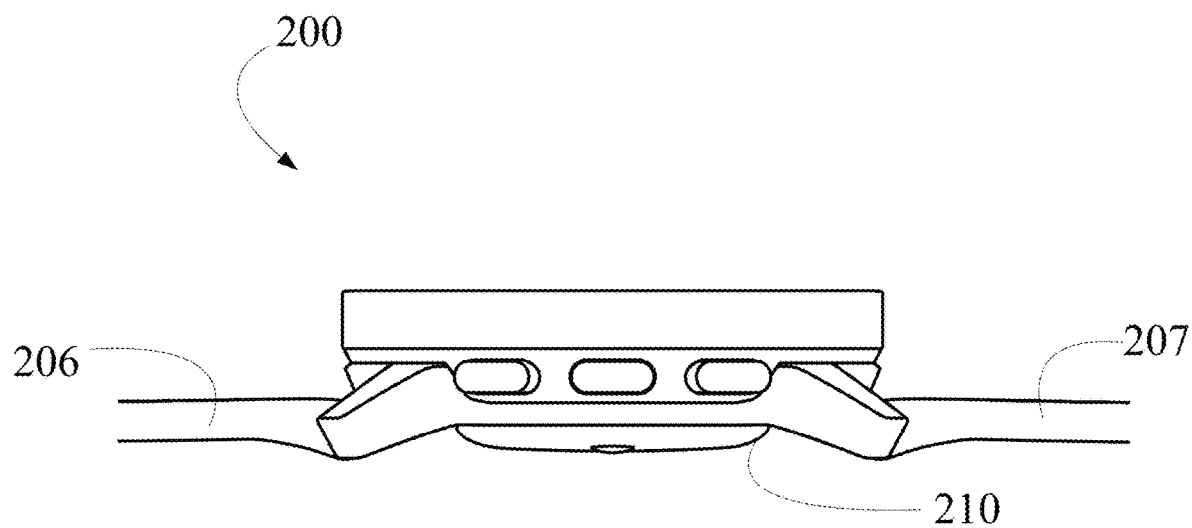
FIGS. 3a and 3b shows, by way of example, a side view of a wearable device and a perspective view of a charger head.
Figure 3B:
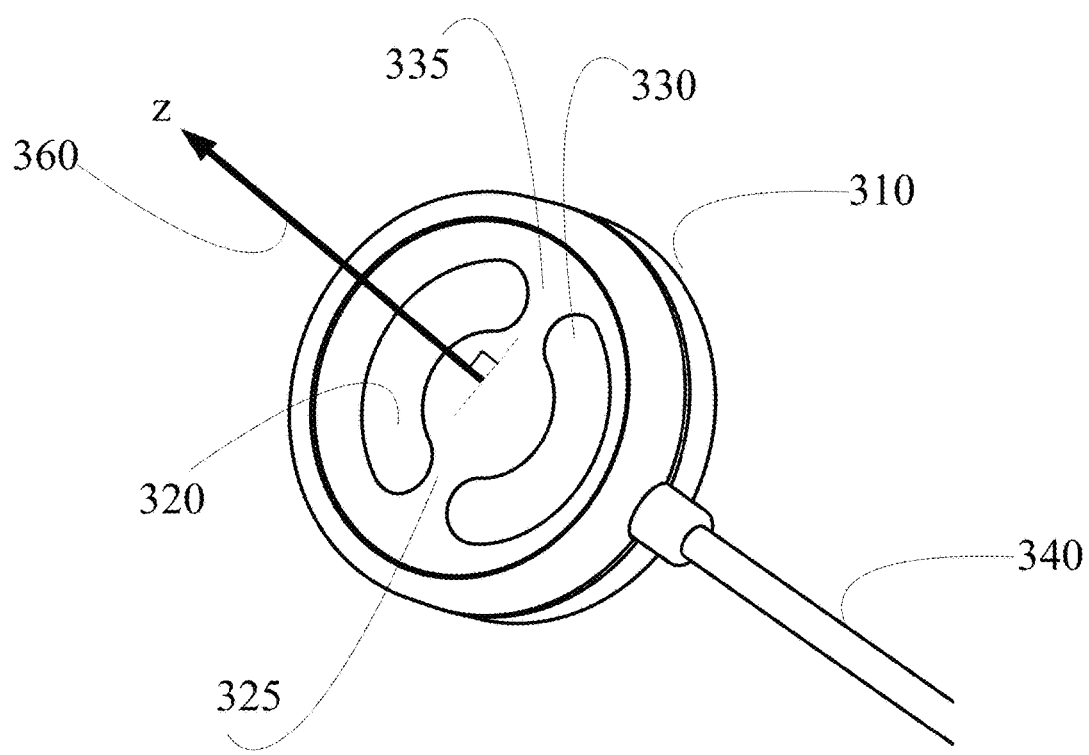

FIGS. 3a and 3b shows, by way of example, a side view of a wearable device 200 and a perspective view of a charger head 310. To further advance accurate alignment between the caseback 210 and the charger head 310, the shape of these counterparts may be such that they match together. For example, the surface of the caseback 210 may take a form of a curved dome. Correspondingly, the surface of the charger 310 may comprise a recess, i.e. take a concave form, such that it is arranged to receive the dome shaped caseback 210. The surface of the caseback may have, at least partly, a curved dome shape. For example, the outer edges of the caseback may comprise a flat surface. The curved dome shape causes also the OHR LEDs, arranged on the dome-shaped surface, to slightly penetrate to a surface of a skin of a user, which improves the quality of the OHR measurement.

In addition to helping in alignment of the caseback 210 and the charger head 310, the concave form of the charger head 310 may protect the connectors 320, 330 of the charger. For example, if a user places the charger head 310 on a metal table, short circuit may be caused between the connectors 320, 330 if the connectors are in contact with the metal table. The concave form of the charger head 310 prevents the contact and thus also the short circuit.

However, if considering placing the caseback side of the wearable device 200 onto the charger head 310, the user may still need to know the correct orientation of the charger head with respect to the caseback 210 in order to correctly connect the connectors of different electrical polarities. Typically, the positive pin of the caseback is to be connected with the positive charger pin and the negative pin of the caseback is to be connected with the negative charger pin. To help the user with the correct alignment, the charger may comprise a small bulge as a protruding part which fits a groove or indentation of a caseback. Alternatively or additionally, the counterparts may comprise colour spots that need to aligned. The alignment may still be erroneous, and it may be noticed in the morning that the charger has not been correctly placed and the battery of the smart watch has not been charged. This may be inconvenient to a user.

There is provided a wearable device 200 comprising connectors, e.g. two connectors 220, 230, with reversible polarities. This means that a first connector 220 may be treated as having a negative or positive polarity, and the second connector 230 may be treated as having a negative or positive polarity. These kind of reversible polarities of the connectors or pins may be realized by applying alternating current bridge in the electronic circuits of the pins. A diode bridge or a rectifier bridge is an electronic circuit arrangement, wherein the polarity of the output is the same regardless of the polarity of the input.

According to an example, the smart watch comprises exactly two connectors 220, 230: one connector may be configured to function as a positive connector and another connector may be configured to function as a negative connector. In other words, one connector may be configured to have a positive polarity and another connector may be configured to have a negative polarity. Choice of the polarity depends on whether the connector of the smart watch is connected to a positive or negative charger pin.

According to another example, the smart watch may comprise the first connector 220 and the second connector 230, and further comprise a ground connector. For example, the caseback may comprise or function as a ground.

Thus, it does not matter which one of the charger pins is in contact with the first connector 220 and the second connector 230 of the wearable device 200, e.g. a smart watch. A positive charger pin 320 may be brought into contact with the first connector 220 and a negative charger pin 330 may be brought into contact with the second connector 230. Alternatively, a positive charger pin 320 may be brought into contact with the second connector 230 of the smart watch and a negative charger pin 330 may be brought into contact with the first connector 220 of the smart watch. Charging of the battery of the watch works regardless of which charger pin is in contact with which connector.

As mentioned, the charger connectors 320, 330 may take a form of an arc, that is, the charger connector may be an arc-shaped plate. The arc-shape of the connectors enables more free positioning of the charger head 310 into contact with the caseback 210, since the surface area of the arc-shape connectors is larger compared to pins, e.g. pogo pins or spring-loaded pins. Thus, the charger head 310 may be positioned into contact with the caseback 210 almost in any position. Charger may be rotated around z-axis 360, with respect to the caseback, almost around a full circle without losing electrical contact between the connectors 220, 230 of the caseback 210 and the arc-shaped connectors, pads, or contact plates 320, 330 of the charger head 310. This is beneficial, since sometimes it may happen that someone accidentally touches and moves the charger or the watch while charging, and the position of the charger head 310 may be changed with respect to the caseback 210 of the watch. However, as arc-shaped connectors 320, 330 of the charger head 310 enable large contact area for the connectors 220, 230 of the watch, the electrical connection is maintained with high probability. There are small spaces or gaps 325, 335, i.e. areas in between the arc-shaped connectors 320, 330. These gaps, which may be referred to as dead spots, may be covered e.g. with plastic or other non-conductive material. This non-conductive material may cover that part of the surface of the charger head 310 which is not covered by the arc-shape connectors 320, 330.

The charger may comprise magnets arranged under the arc-shaped connectors 320, 330. The magnets attract the ferrous connectors 220, 230 of the caseback 210 and allow easier positioning and attachment of the counterparts into contact with each other. Because of the magnets, it is highly unlikely that the connectors 220, 230 of the caseback 210 would be positioned on the dead spots 325, 335.

The surfaces of the arc-shaped connectors 320, 330 may be flat and level, and/or smooth, scratching the surface of the caseback 210 of the watch is prevented. For example, smaller pins of the charger head 310 may cause scratching of the surface of the caseback 210 and possibly cause damage to the OHR sensors.

If the arc-shaped connectors 320, 330 slide against the connectors 220, 230 of the caseback, this sliding may remove dirt and dust, and a good contact between the arc-shaped connectors 320, 330 and the connectors 220, 230 of the caseback 210 is maintained.

Referring back to FIG. 2a the first connector 220 and the second connector 230 may be positioned symmetrically on the caseback 210. Positioning may be such that a line 208 traversing through the connectors 220, 230 may be in a straight angle, or in approximately a straight angle, with respect to a line 209 which is parallel with the straps 206, 207. Referring back to FIG. 2b, the cable 340 may be in a straight angle, or in approximately a straight angle, with respect to an imaginary line 305 traversing through the dead spots 325, 335. Positioning of the cable 340 of the charger with respect to the arc-shaped connectors 320, 330, and the gaps 325, 335 between them, and positioning of the connectors 220, 230 of the caseback 210 may be such that during charging, the cable 340 is not directed towards or along the straps 206, 207 of the watch. During charging, the line 305 traversing through the dead spots is directed towards the straps 206, 207. This prevents pending of the cable 340 against the straps which may cause unfastening of the caseback 210 from the charger head 310.

According to an example, the first connector 220 and the second connector 230 of the caseback 210 may be positioned such that a line traversing through the connectors is parallel with a line which is parallel with the straps 206, 207. In that case, the cable 340 may be coupled to the charger head such that it is parallel with the imaginary line 305 traversing the dead spots 325, 335.

The wearable device may be equipped with an electrostatic discharge protection circuit and/or an overload circuit to protect the device from sparks and/or fault current.

The charger may be equipped with an electrostatic discharge protection circuit and/or an overload circuit to protect the device from sparks and/or fault current.

Data may be transferred from the wearable device to other devices, and from other devices to the watch, by wire or wirelessly. Memory of the wearable device may be limited, and to have memory for saving more data, older data may be transferred from the memory of the wearable device to another memory which is external to the wearable device. For example, user may want to upload exercise data and other health monitoring data to a cloud based memory or to a portable memory, or to a computer memory. Examples of wireless technologies for data transfer include near-field communication (NFC), Bluetooth, and infrared data association (IrDA) communication. Even though data may be transferred wirelessly, a wired connection is beneficial for transferring large amounts of data, e.g. uploading updates for the software to the wearable device.

Universal serial bus (USB) connectors and cables are widely used with wearable devices. However, additional port is needed for data transfer via USB cable. The USB port need to be protected properly from moisture and dirt, e.g. using a rubber seal, requiring additional parts attached to the caseback. Additional parts may be uncomfortable for the user. In addition, with regards to manufacturing of the watch, it would be beneficial to have as low number of inlets on the caseback as possible. In addition to having lower manufacturing costs compared to a large number of inlets with seals, a minimum number of inlets is beneficial in order to prevent excess moisture and dirt from entering the device, and to allow enough space e.g. for OHR measurement LEDs. At least in some embodiments, the wearable device as disclosed herein does not comprise a USB port.

In general, wearable devices may comprise additional connectors for purpose of data transfer. For example, a wearable device may comprise two connectors for charging and two connectors for data transfer. However, additional connectors also increase the number of inlets.

The connectors of the wearable device as disclosed herein may be configured to serve purpose of data transfer as well. The same connectors of the wearable device, e.g. the first connector and the second connector, may be used for charging the device and for data transfer. A docking station for charging and/or for data transfer may be in use at manufacturing site or service site, or at any site where a docking station is available. The wearable device may be connected to a docking station, or charging and/or communication jig, such that the first connector and the second connecter of the wearable device may be connected to connectors of the docking station. The docking station may comprise a slot with connectors that is configured to receive the wearable device. The docking station may communicate with another device, e.g. a computer, via a wired communication connection. The wired connection may be formed via a cable. For example, the cable may be cable with a USB connector, or a cable with another connector supporting other serial communication transmission of data. Examples of such serial communication technologies are recommended standard 232 (RS-232), universal asynchronous receiver-transmitter (UART), RS-485, inter-integrated circuit (I$^2$C), 1-Wire, and low-voltage differential signaling (LVDS).

The first connector 220 may be configured to function as a positive pole or terminal and the second connector 230 may be configured to function as a negative pole or terminal, or vice versa. If a ground is needed for a data transfer protocol, a caseback 210 or a housing 205 or a screw, for example, may function as a ground, or, the caseback 210 may comprise a ground connector.

In at least some embodiments, the wearable device is to be connected to the docking station for data transfer such that correct connectors are connected. Even though the first connector and the second connector are configured to have reversible polarities, for data transfer between the wearable device and the docking station, the wearable device is to be connected to the docking station in a certain position so that the wearable device is connected in a right way. Manufacturing costs of the wearable device are saved when the transfer of data signals is realized such that connectors of the wearable device are to be connected with correct connectors of the docking station. In other words, manufacturing costs of wearable device with symmetric connectors that enable coupling in both ways for data transfer, that is, irrespective of which connectors are connected, are higher than of a wearable device with asymmetric connectors that need to be coupled with correct connectors of the docking station.

However, in at least some embodiments, the wearable device may have symmetric connectors that enable coupling in both ways for data transfer.

For charging purposes, the connectors of the wearable device may be connected to the connectors of the docking station, which functions as a charger, in both ways.

The first connector 220 and the second connector 230 may be de-energized to avoid short circuits due to salty skin, for example.

The handshaking protocol between the docking station and the wearable device may be based on, for example, simple message exchange between the docking station and the wearable device, voltage levels, and/or a pulse sequence.

Let us consider that detection of a connected device and the handshaking protocol is performed based on voltage levels, e.g. two or three different voltage levels. Without any device connected, the docking station detects a first voltage level. When the wearable device is connected to the connectors of the docking station, the docking station detects a second voltage level (non-zero) which is lower than the first voltage level. When the wearable device is connected to the docking station, a processor of the wearable device is activated from a deactivated state in response to detecting a voltage or voltage change. When the docking station and the wearable device are connected, the actual handshaking process is established between them.

The wearable device may comprise a separate logical circuit for communication with the docking station for data transfer and/or charging. Therefore, there is no need to wait for a main processor of the wearable device to turn on.

In response to the handshaking, it is determined whether a formed connection is for charging or for data transfer. When the docking station and the wearable device are connected, they may be in a charging state or in a communication state, i.e. data transfer state. The charging state may be set as a default state. Then, even if the battery of the wearable device is empty or removed, the wearable device can be charged or powered, without control signals from the processor or logic circuit. The state may be changed, that is, it is possible to change the state from the charging state to the communication state, and vice versa, when the docking station and the wearable device are connected. Then, the handshaking may be performed again. A user may provide input to the docking station such that based on the input, it may be determined by the docking station whether the wearable device is to be charged, or whether the wearable device is connected to the docking station for data transfer. The docking station may act as a host. The state may be determined based on user input, for example. If the battery of the wearable device has run out, or has almost run out, the docking station and/or wearable device may detect that and they can automatically switch to the charging state.

Figure 4:
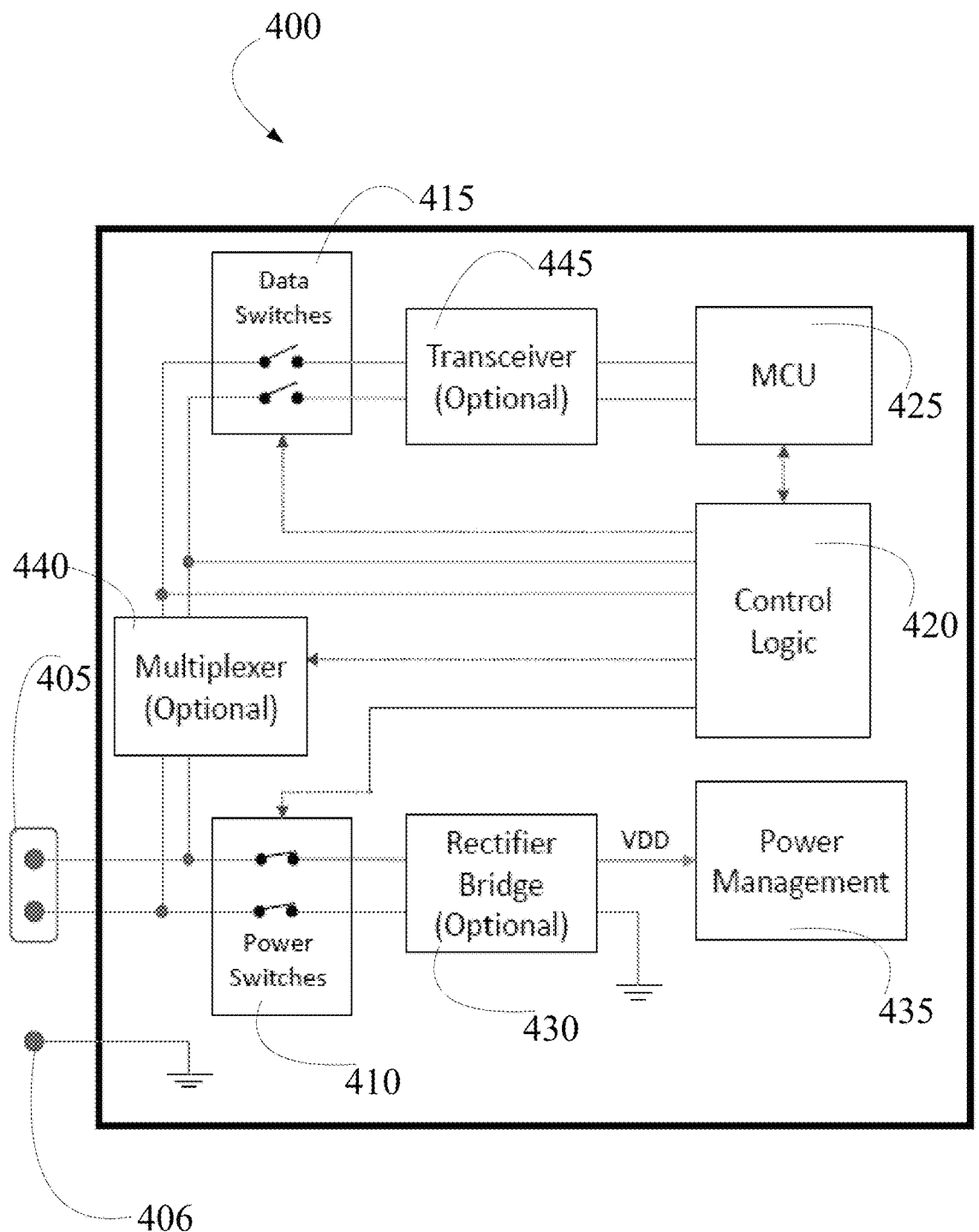
FIG. 4 shows, by way of example, a block diagram of a wearable device.

FIG. 4 shows, by way of example, a block diagram of a wearable device 400. The wearable device comprises the first connector and the second connector, that is, the two-wire contacts 405. The contacts 405 are for interfacing with a charger or with another device, e.g. a docking station of FIG. 5. The wearable device may comprise a ground connector 406, or grounded parts of the wearable device may function as a ground contact. Examples of such parts are screws and a frame of the device. Separate ground connector may be used with communication protocols that utilize two wires, such as USB, I²C, RS-232 and full-duplex UART.

The wearable device comprises power switch 410 and data switch 415. The power switch may be a first switch, i.e. a first pair of switches. The data switch may be a second switch, i.e. a second pair of switches. The wearable device comprises control logic 420 configured to control the power switches 410 and the data switches 415 based on handshaking, for example, or based on an input signal received from the docking station via the connectors. The control logic 420 is configured to open and/or close the switches for connecting the contacts 405 of the wearable device either to a communication circuit, i.e. a data transfer circuit, or to a charging circuit. Functions of the control logic 420 may be handled by a microcontroller unit (MCU) 425, or dedicated circuits may be used.

For initializing the charging state, the docking station feeds a first voltage, e.g. approximately 5 V, to the wearable device. For initializing the communication state, the docking station feeds a second voltage, which is lower than the first voltage, to the wearable device. The second voltage may be e.g. approximately 3 V. When the wearable device detects the second voltage, the wearable device closes the data switches and opens the power switches. Then, the wearable device is ready for data transfer with the docking station.

The wearable device may be configured such that the voltage level of the battery needs to be at least a pre-defined voltage level to allow the communication state. This pre-defined voltage level, e.g. approximately 3.6 V, is defined such that it is enough to keep the wearable device on during an important update, e.g. during operating system update. This will prevent a situation that the battery runs out during the important update. If the battery runs out during the important update, the wearable device may be damaged.

When the battery has reached the pre-defined voltage level, the wearable device may signal to the docking station that the wearable device is ready for communication state. This signalling may be e.g. a short voltage drop to approximately 0 V.

If a charging state is selected based on the handshaking, the contacts 405 are connected to the charging circuit such that the power switches 410 are closed, or kept closed, by the control logic 420. The data switches 415 are open in the charging state. Charging voltage (VDD) is supplied from the contacts 405 to a battery in power management 435 via the closed power switches 410. The wearable device may comprise a rectifier bridge 430, which is needed when the polarity of a charging voltage at the two-wire contacts 405 is unknown.

The power switches 410 may be configured to be closed by default. Then, even if the battery of the wearable device is empty or removed, the wearable device can be charged or powered.

If a communication state is selected based on the handshaking, the contacts 405 are connected to the communication circuit such that the data switches 415 are closed by the control logic 420, and the power switches 410 are opened. The wearable device may comprise a multiplexer 440, which is needed when the order of the communication signals at the two-wire contacts 405 is unknown.

The wearable device may comprise a transceiver 445. For example, the MCU 425 might not be able to natively handle the data format used between the docking station and the wearable device. The communication protocol used between the docking station and a computer may be different than the communication protocol used between the docking station and the wearable device. In these situations, the transceiver may be used for converting voltage levels and handling different communication protocols such that the MCU is able to handle the data format.

Figure 5:
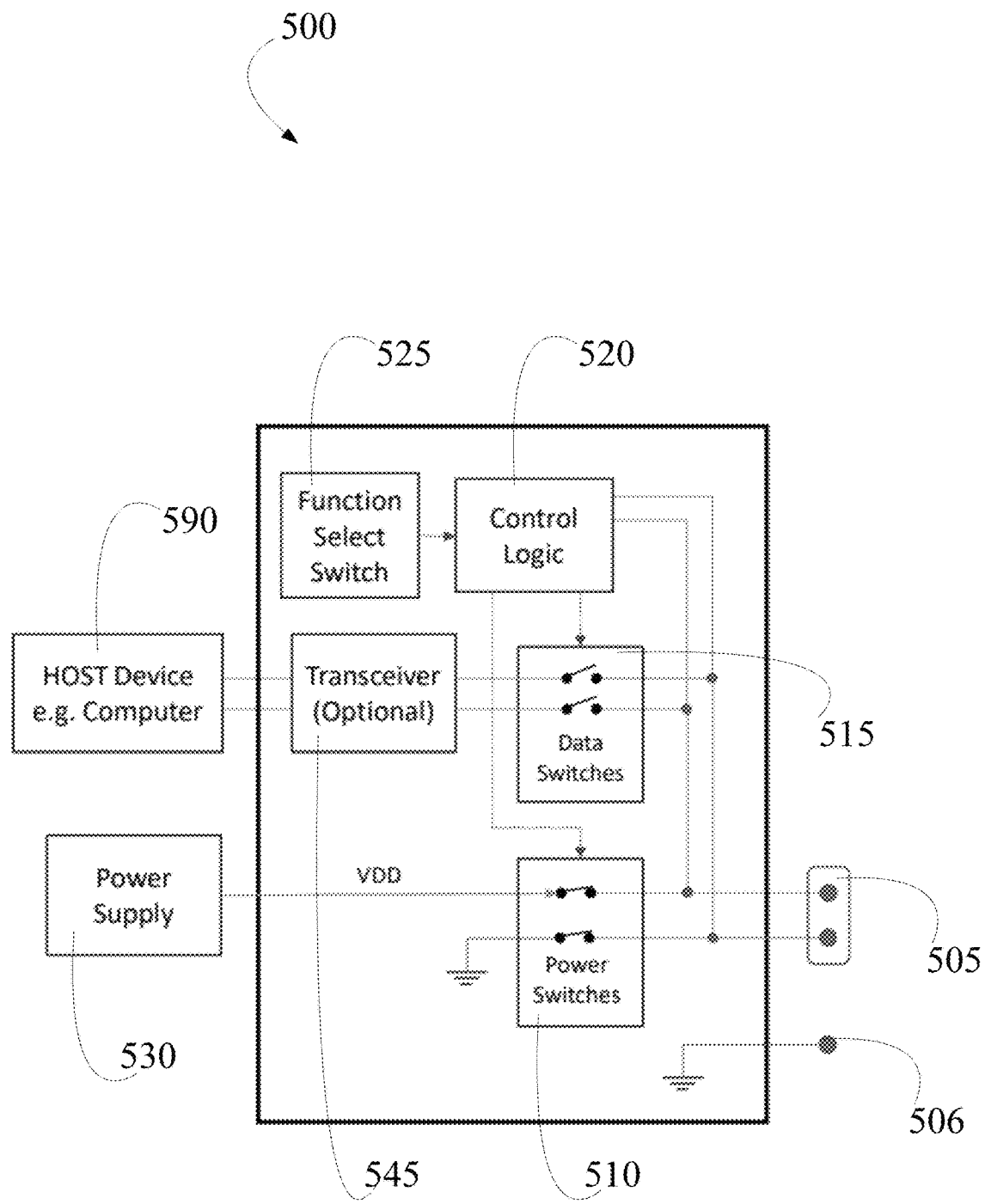
FIG. 5 shows, by way of example, a block diagram of a docking station.

FIG. 5 shows, by way of example, a block diagram of a docking station 500. The docking station comprises a first connector and a second connector, that is, the two-wire contacts 505. The contacts 505 are for interfacing with a wearable device via the contacts 405 of FIG. 4. The docking station may comprise a ground connector 506.

The docking station comprises a power switch 510 and a data switch 515. The power switch may be a first switch, i.e. a first pair of switches. The data switch may be a second switch, i.e. a second pair of switches. The docking station comprises control logic 520 configured to control the power switches 510 and the data switches 515 based on handshaking, for example, or based on input from a function select switch 525. The control logic 520 is configured to open and/or close the switches for connecting the contacts 505 of the docking station either to a power supply 530 or to a communication circuit of the docking station. The function select switch 525 may be e.g. a manual switch, or a logic control from an external device such as a host device 590. If it is a manual switch, a user may provide input for selecting the operating mode of the docking station. The operating mode may be either a charging state or a communication state.

The host device 590 may be e.g. a computer such as a personal computer. The docking station comprises a port for enabling connecting the docking station to the host device. For example, the docking station may be connected to a USB port of the host device 590.

If a charging state is selected, the contacts 505 are connected to the power supply 530 such that the power switches 510 are closed, or kept closed, by the control logic 520. The data switches 515 are open in the charging state. The power supply may be e.g. a USB port of a host device 590 or a discrete wall charger. Charging voltage (VDD) may be supplied from the power supply via the contacts 505 to the wearable device.

If a communication state is selected, the contacts 505 are connected to the communication circuit such that the data switches 505 are closed by the control logic 520, and the power switches 510 are opened. The docking station may communicate with the host device 590. The docking station may comprise a transceiver 545. For example, if the host device 590 cannot natively handle the data format used between the docking station and the wearable device, the transceiver may be used for converting voltage levels and handling different communication protocols such that the host device 590 is able to handle the data format.

When the communication state is selected, the wearable device, which is connected to the docking station, may communicate with the host device 590 via the docking station. For example, software updates and/or operating system updates may be downloaded from the host device to the wearable device. Data may be transferred from the wearable device to the host device as well.

When the wearable device is disconnected from the docking station, the wearable device and the docking station may detect the disconnection based on a voltage change or terminated communication between the devices, for example. In response to disconnection, states of the wearable device and the docking station may be changed to handshaking states. In response to disconnection, the power switches may be closed if they are open.

Figure 6:
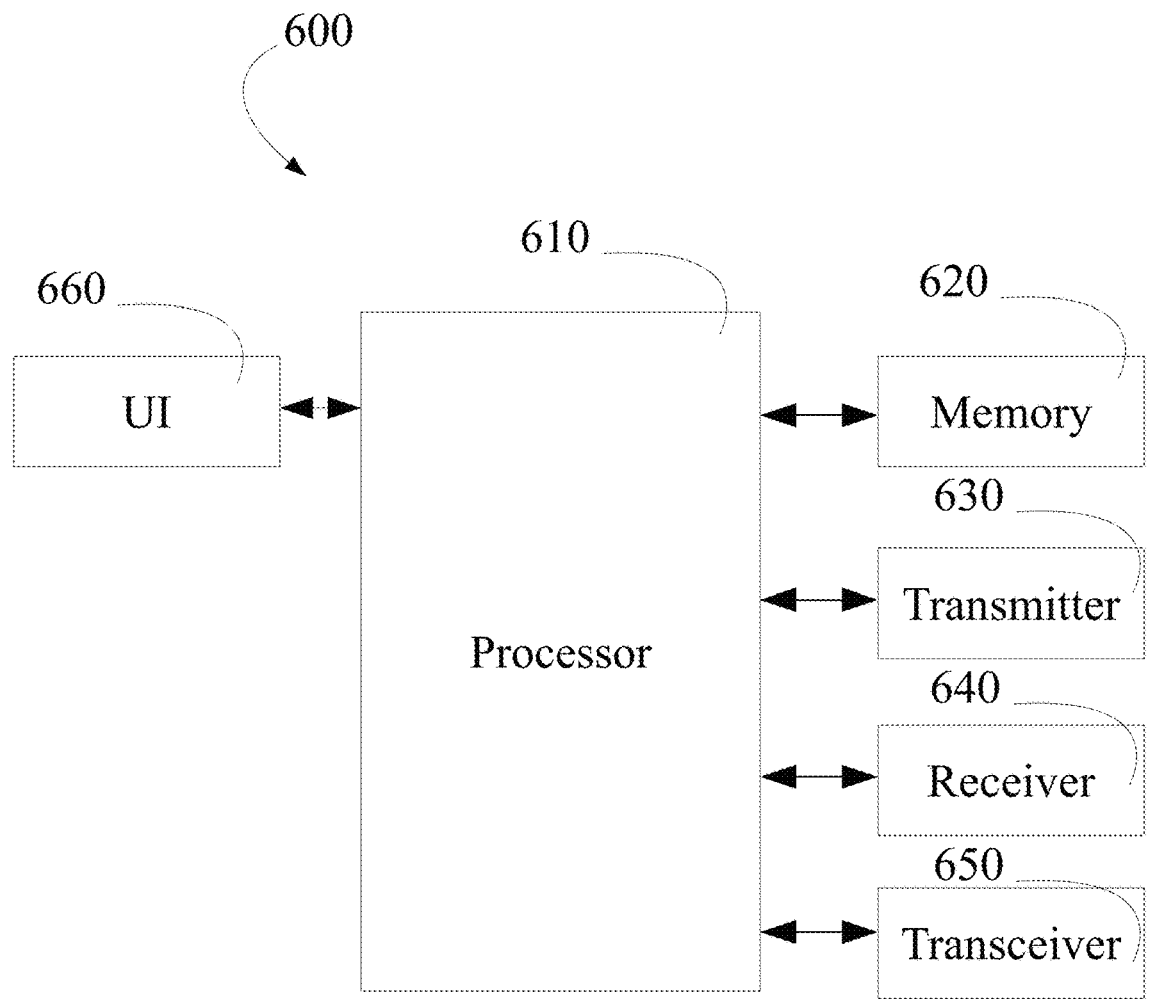
FIG. 6 shows, by way of example, a block diagram of an apparatus.

FIG. 6 shows, by way of example, a block diagram of an apparatus. Illustrated is an apparatus or device 600, which may comprise, for example, a wearable device such as a sport watch or smart watch 110 of FIG. 1 or a docking station of FIG. 7. Comprised in device 600 is processor 610, which may comprise, for example, a single- or multi-core processor wherein a single-core processor comprises one processing core and a multi-core processor comprises more than one processing core. Processor 610 may comprise, in general, a control device. Processor 610 may comprise more than one processor. Processor 610 may be a control device. A processing core may comprise, for example, a Cortex-A8 processing core manufactured by ARM Holdings or a Steamroller processing core designed by Advanced Micro Devices Corporation. Processor 610 may comprise at least one Qualcomm Snapdragon and/or Intel Atom processor. Processor 610 may comprise at least one application-specific integrated circuit, ASIC. Processor 610 may comprise at least one field-programmable gate array, FPGA. Processor 610 may be means for performing method steps in device 600. Processor 610 may be configured, at least in part by computer instructions, to perform actions.

Device 600 may comprise memory 620. Memory 620 may comprise random-access memory and/or permanent memory. Memory 620 may comprise at least one RAM chip. Memory 620 may comprise solid-state, magnetic, optical and/or holographic memory, for example. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and device 600 overall is configured to run under the direction of processor 610 using computer instructions from memory 620, processor 610 and/or its at least one processing core may be considered to be configured to perform said certain actions. Memory 620 may be at least in part comprised in processor 610. Memory 620 may be at least in part external to device 600 but accessible to device 600. Memory 620 may store one or more recipes provided by a third party.

Device 600 may comprise a transmitter 630. Device 600 may comprise a receiver 640. Transmitter 630 and receiver 640 may be configured to transmit and receive, respectively, information in accordance with at least one cellular or non-cellular standard. Transmitter 630 may comprise more than one transmitter. Receiver 640 may comprise more than one receiver. Transmitter 630 and/or receiver 640 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 600 may comprise a near-field communication, NFC, transceiver 650. NFC transceiver 650 may support at least one NFC technology, such as NFC, Bluetooth, Wibree or similar technologies.

Device 600 may comprise a port for a cable for wired data communication or charging. For example, the device may comprise a USB port.

Device 600 may comprise, or may be coupled to, a user interface, UI, 660. UI 660 may comprise at least one of a display, buttons, a keyboard, a touchscreen, a vibrator arranged to signal to a user by causing device 600 to vibrate, a speaker and a microphone. A user may be able to operate device 600 via UI 660, to manage digital files stored in memory 620 or on a cloud accessible via transmitter 630 and receiver 640, or via NFC transceiver 650.

Figure 7:
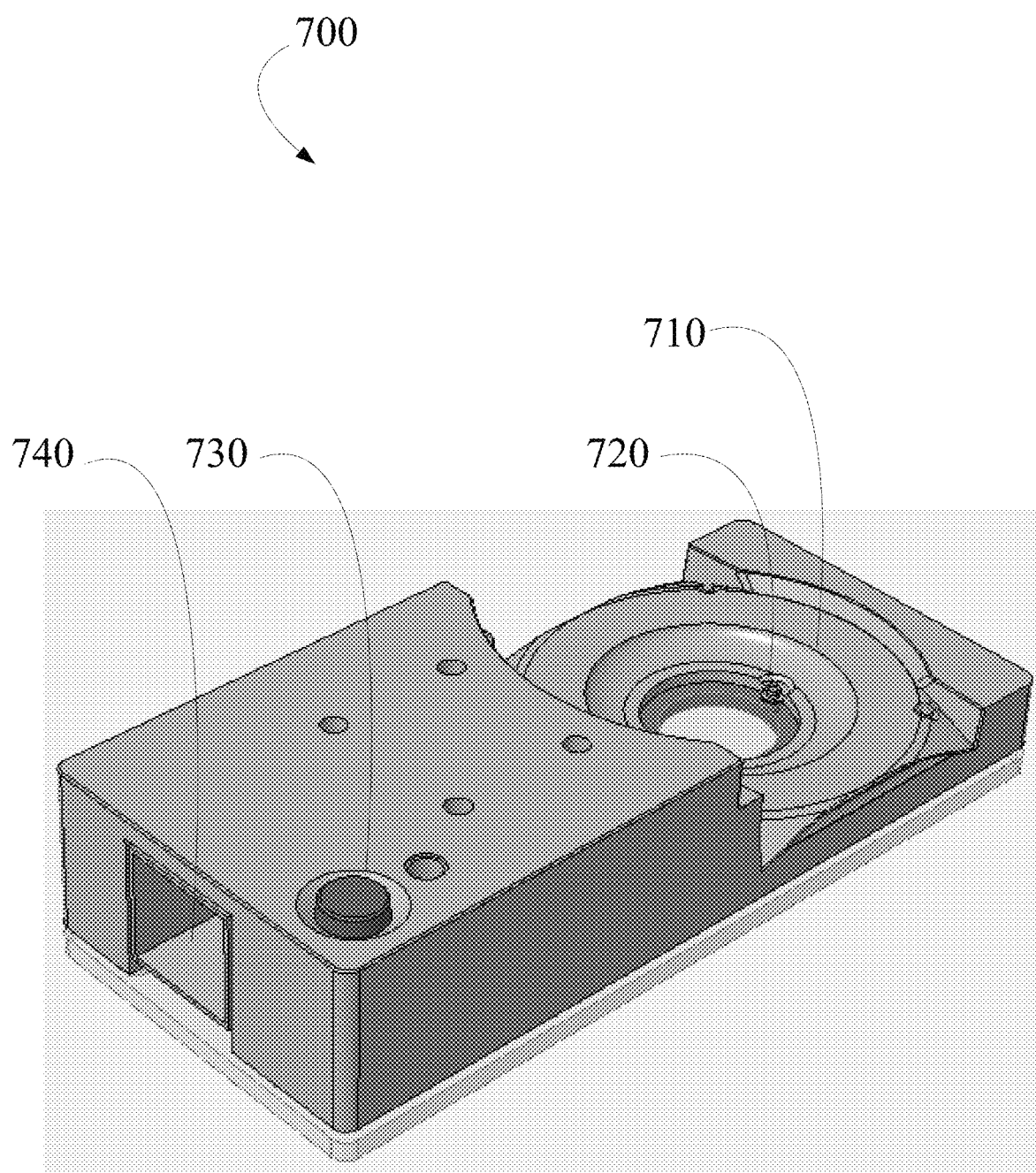
FIG. 7 shows, by way of example, a docking station.

FIG. 7 shows, by way of example, a docking station 700. The docking station may comprise a place or a holder 710 for a wearable device. The docking station may be custom-made such that specific wearable devices may be attached to the docking station by placing the wearable device to the holder. Shown is one of the connectors, i.e. a connector 720, of the docking station. In the example of FIG. 7, the docking station comprises a manual function select switch 730 for selecting either a charging state or a communication state. The docking station comprises a port 740 for a cable, such as a USB cable, for connecting the docking station to the host device.

The invention claimed is:

1. A charger cable for charging a wearable device, comprising
 a charger head comprising
 a first connector with positive polarity; and
 a second connector with negative polarity, wherein the first connector and the second connector are arc-shaped.

2. The charger cable of claim 1, wherein the arc-shaped connectors are placed symmetrically on the charger head.

3. The charger cable of claim 2, wherein a surface of the charger head has, at least partly, a concave form for receiving a caseback of the wearable device comprising a surface having, at least partly, a form of a curved dome.

4. The charger cable of claim 2, wherein the charger head comprises one or more magnets for attracting connectors of the wearable device.

5. The charger cable of claim 2, wherein the arc-shaped connectors each comprise an end and wherein the charger cable comprises a non-conductive gap between the ends of the arc-shaped connectors.

6. The charger cable of claim 5, wherein the cable is in a substantially straight angle with respect to an imaginary line traversing through the non-conductive gaps.

7. The charger cable of claim 2, wherein the first connector and the second connector are concentric arcs separated by non-conductive gaps.

8. The charger cable of claim 1, wherein a surface of the charger head has, at least partly, a concave form for receiving a caseback of the wearable device comprising a surface having, at least partly, a form of a curved dome.

9. The charger cable of claim 8, wherein the charger head comprises one or more magnets for attracting connectors of the wearable device.

10. The charger cable of claim 1, wherein the charger head comprises one or more magnets for attracting connectors of the wearable device.

11. The charger cable of claim 10, wherein the one or more magnets are arranged under the arc-shaped connectors.

12. The charger cable of claim 1, comprising non-conductive gap between ends of the arc-shaped connectors.

13. The charger cable of claim 12, comprising a connector at an end of the cable for connecting the charger cable to a power source or to a transformer.

14. The charger cable of claim 1, wherein the cable is in a substantially straight angle with respect to an imaginary line traversing through the non-conductive gaps.

15. The charger cable of claim 14, comprising a connector at an end of the cable for connecting the charger cable to a power source or to a transformer.

16. The charger cable of claim 1, comprising a connector at an end of the cable for connecting the charger cable to a power source or to a transformer.

17. The charger cable of claim 1, wherein the first connector and the second connector are concentric arcs separated by non-conductive gaps.

18. The charger cable of claim 1, wherein the arc-shaped connectors each comprise an end and wherein the charger cable comprises a non-conductive gap between the ends of the arc-shaped connectors.

* * * * *